(12) United States Patent
Terashima et al.

(10) Patent No.: US 10,161,467 B2
(45) Date of Patent: Dec. 25, 2018

(54) ACTIVE VIBRATION CONTROLLER

(71) Applicant: HONDA MOTOR CO., LTD., Tokyo (JP)

(72) Inventors: Osamu Terashima, Wako (JP); Toshio Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/589,304

(22) Filed: May 8, 2017

(65) Prior Publication Data

US 2017/0328433 A1 Nov. 16, 2017

(30) Foreign Application Priority Data

May 11, 2016 (JP) .................................. 2016-095319

(51) Int. Cl.
*F16F 1/36* (2006.01)
*F16F 15/03* (2006.01)
*F16F 6/00* (2006.01)

(52) U.S. Cl.
CPC ............ *F16F 1/3615* (2013.01); *F16F 1/361* (2013.01); *F16F 15/03* (2013.01); *F16F 6/00* (2013.01)

(58) Field of Classification Search
CPC .......... F16F 1/3615; F16F 1/361; F16F 15/03; F16F 6/00
See application file for complete search history.

(56) References Cited

U.S. PATENT DOCUMENTS

| | | | |
|---|---|---|---|
| 9,835,218 B2* | 12/2017 | Inoue | F16F 7/1011 |
| 2009/0133976 A1* | 5/2009 | Bose | F16F 9/535 |
| | | | 188/267.2 |
| 2013/0127098 A1* | 5/2013 | Kim | F16F 1/361 |
| | | | 267/140.15 |

(Continued)

FOREIGN PATENT DOCUMENTS

| | | |
|---|---|---|
| CN | 1664402 A | 9/2005 |
| CN | 104728341 A | 6/2015 |
| CN | 104835490 A | 8/2015 |

(Continued)

OTHER PUBLICATIONS

Japanese Office Action with English Translation dated Feb. 27, 2018, 6 pages.

(Continued)

*Primary Examiner* — Vishal R Sahni
(74) *Attorney, Agent, or Firm* — Rankin, Hill & Clark LLP

(57) ABSTRACT

An active vibration controller includes: a housing; a first magnetic member installed on the side of the housing having a toric shape; a movable member including a second magnetic member that is substantially coaxial with the first magnetic member and disposed inside the toric shape of the first magnetic member; an exciting coil that generates a magnetic field in accordance with an intensity of a current supplied thereto; and a magnetic viscoelastic elastomer that has a magnetic viscoelastic property varying in accordance with a magnitude of the magnetic field from the exciting coil between the first and second tip portions, and connects the first magnetic core to the second magnetic core. The magnetic viscoelastic elastomer has a region having a non-magnetic property between the first and the second magnetic cores.

7 Claims, 4 Drawing Sheets

(56) References Cited

U.S. PATENT DOCUMENTS

2015/0228267 A1  8/2015  Inoue

FOREIGN PATENT DOCUMENTS

| JP | H09-25976 A | 1/1997 |
| JP | 2001-200936 A | 7/2001 |
| JP | 2016-044717 A | 4/2016 |
| WO | 97/03307 A1 | 1/1997 |
| WO | 2012-026332 A1 | 3/2012 |

OTHER PUBLICATIONS

Chinese Office Action with English translation, dated Sep. 17, 2018, 10 pages.

* cited by examiner

ACTIVE VIBRATION CONTROLLER

CROSS REFERENCE TO RELATED APPLICATION

This application claims the foreign priority benefit under Title 35, United States Code, § 119(a)-(d) of Japanese Patent Application No. 2016-095319, filed on May 11, 2016 in the Japan Patent Office, the disclosure of which is herein incorporated by reference in its entirety.

BACKGROUND OF THE INVENTION

1. Field of the Invention

The present invention relates to an active vibration controller.

2. Description of the Related Art

In conventional passive-type vibration absorbers, an eigenvalue of the vibration absorber is uniquely determined because a physical property of the configuration elements is fixed. Accordingly, when a frequency of the disturbance vibration agrees with the eigenfrequency of the vibration absorber, a high damper effect is given. However, when the frequency of the disturbance vibration is different from the eigenfrequency even slightly or when the frequency of the disturbance vibration varies as time passes, i.e., in an unstable state, the damper effect of the dynamic absorber cannot be fully given. Regarding this problem, a method of designing an optimal tuning and optimal damping to keep a damping effect over a certain frequency band is known. However, its damping effect is insufficient.

On the other hand, as a counter part of the passive type of damping device, an active mass damper is known. In this method, an actuator for forcibly vibrating a mass is installed in addition to the mass element. This provides a high damping effect irrespective of stable or unstable in frequency because, theoretically, an arbitrary damping force can be generated though any disturbance is applied. However, there are problems in that a device to directly apply outer energy becomes complicated and that a control system designing become necessary to avoid unstableness, and that a cost is high. Further, there is a semi-active type of a control method which is an intermediate type between the passive type and the active type. In the semi-active type of damper, a physical characteristic of one of configuration elements, which is originally fixed in the passive type system, is made variable with some means to have variability in the physical characteristic in the system. This enables the system control while the variation due to a disturbance is tracked to some extent. The semi-active type of control method has advantageous effects such as a control performance close to the active type of control method with reliability and stability derived from the passive elements and provides a device at a cost which is lower than that of the active type of control.

WO 2012/026332 discloses a configuration for varying an elastic modulus of a magnetic elastic body by application of a magnetic field generated by an exciting coil using a configuration in which the exciting coil is arranged around an outer circumference of a magnetic elastic body of which elastic modulus can be changed by application of a magnetic field by the exciting coil.

WO 2012/026332 disclosed a technology in which a stiffness of a magnetic viscoelastic elastomer is changed by application of a magnetic field to the magnetic response-type elastic body (magnetic viscoelastic elastomer) is changed. When the magnetic field is applied to the magnetic viscoelastic elastomer, the magnetic field is applied to the magnetic viscoelastic elastomer uniformly and varies the stiffness of the magnetic viscoelastic elastomer in accordance with the application intensity of the magnetic field. The magnetic viscoelastic elastomer can be produced by dispersing magnetic particles in, for example, rubber.

However, it was forced to distribute the magnetic particles in a part which does not largely contribute to change the stiffness of the magnetic viscoelastic elastomer, it is necessary to increase an amount of the magnetic particles included in a base material to increase a variation in stiffness of the magnetic viscoelastic elastomer. This may invite an increase in a lower limit of the base stiffness of the magnetic viscoelastic elastomer.

Further, the magnetic field cannot be applied to the magnetic viscoelastic elastomer efficiently because the magnetic field may be applied to the part of the magnetic viscoelastic elastomer in which the magnetic particles are not distributed, so that it was not performed to apply the magnetic field to the magnetic viscoelastic elastomer efficiently. Accordingly, it was forced to increase a magnitude of the generated magnetic filed by increasing the applied current to generate the magnetic field. In addition, there is a problem in that an effect of the magnetic viscoelastic elastomer as a spring in a dynamic damper may be low because the magnetic viscoelastic elastomer has a large attenuation characteristic.

SUMMARY OF THE INVENTION

An aspect of the present invention provides an active vibration controller capable of efficiently apply the magnetic field to the magnetic viscoelastic elastomer with a manufacturing cost of the magnetic viscoelastic elastomer being decreased.

An aspect of the present invention provides an active vibration controller comprising:

a housing;

a first magnetic member installed on the side of the housing having a toric shape;

a movable member including a second magnetic member that is substantially coaxial with the first magnetic member and disposed inside the toric shape of the first magnetic member;

an exciting coil that generates a magnetic field in accordance with an intensity of a current supplied thereto; and a magnetic viscoelastic elastomer that has a magnetic viscoelastic property varying in accordance with a magnitude of the magnetic field from the exciting coil between the first and second tip portions, and connects the first magnetic core to the second magnetic core, wherein the magnetic viscoelastic elastomer has a region having a non-magnetic property between the first and the second magnetic cores.

According to the present invention, the magnetic viscoelastic elastomer is not formed at the region. The magnetic field hardly transmits through the region having a non-magnetic property. Accordingly, the magnetic flux lines are concentrated at the remaining region of the region. Accordingly, a manufacturing cost can be reduced by the omission of the magnetic viscoelastic elastomer (magnetic particles) and the lower limit of the base stiffness of the magnetic viscoelastic elastomer 13 can be reduced. Further, because the magnetic field can be applied to the magnetic viscoelastic elastomer except the region in a concentrated manner, which makes the magnetic field application to the magnetic viscoelastic elastomer efficient. This enhances the efficient of providing the magnetic viscoelastic elastomer.

The region may include a gap in the magnetic viscoelastic elastomer.

According to the present invention, regions having a non-magnetic property can be formed easily because it is enough to form the magnetic viscoelastic elastomer with the gaps intermittently in a circumferential direction of the first magnetic core.

In this case, the magnetic viscoelastic elastomer may have a cross sectional area orthogonal with a direction or an opposite direction in which the magnetic flux transmits through the magnetic viscoelastic elastomer. The cross sectional area becomes smaller in the direction or the opposite direction.

According to the present invention, it becomes possible to apply the magnetic concentrated in a direction in which the cross sectional area becomes small.

In the case, the first magnetic core may be formed, at a part thereof joined to the magnetic viscoelastic elastomer, protruding toward the magnetic viscoelastic elastomer.

According to the invention, it is possible to apply the magnetic field to the magnetic viscoelastic elastomer from the protruding portion of the first magnetic core in a concentrated manner.

In this case, the second magnetic core may include, at a part thereof joined to the magnetic viscoelastic elastomer, a protruding portion protruding toward the magnetic viscoelastic elastomer.

According to the present invention, it is possible to apply the magnetic field to the magnetic viscoelastic elastomer from the protruding portion of the second magnetic core in a concentrated manner.

An aspect of the present invention provides an active vibration controller at a low manufacturing cost of the magnetic viscoelastic elastomer and being capable of applying the magnetic field to the magnetic viscoelastic elastomer efficiently.

DETAILED DESCRIPTION OF THE INVENTION

First Embodiment

A first embodiment of the present invention is described below in detail, referring to the attached drawing.

Figure 1:
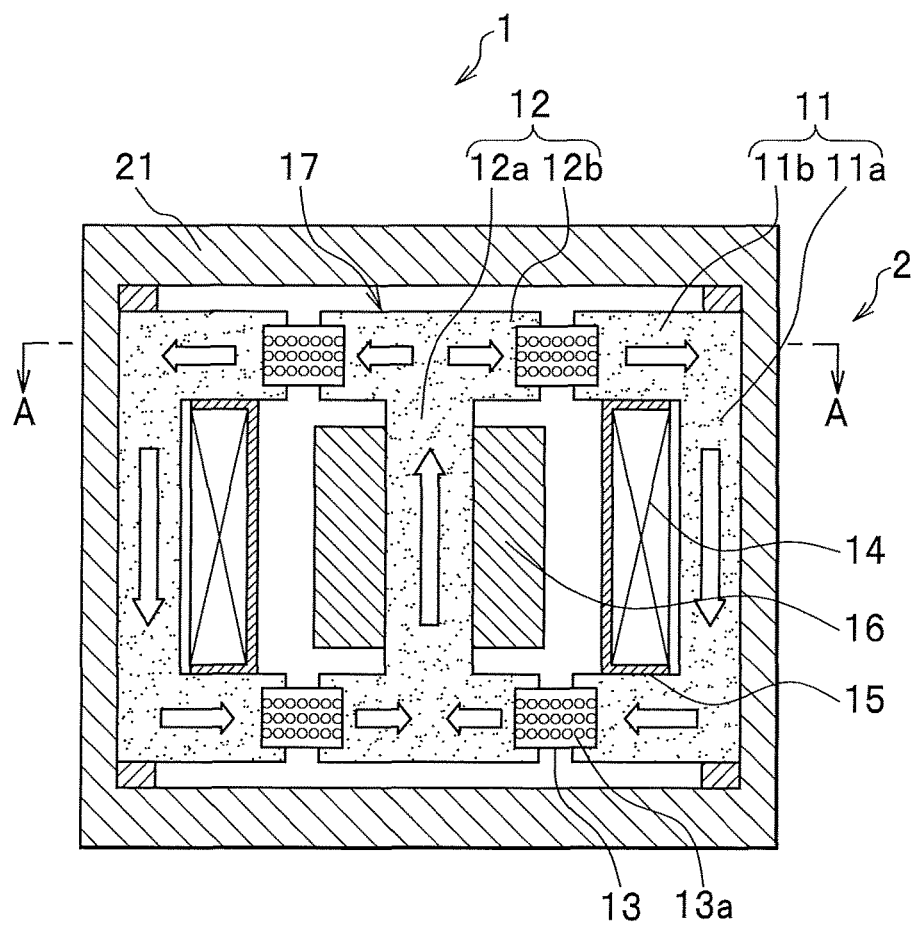
FIG. 1 is an elevational sectional view of the active vibration controller according to a first embodiment of the present invention.

FIG. 1 is an elevational sectional view of the active vibration controller according to the first embodiment of the present invention.

An active vibration controller 1 includes a housing 21 having a non-magnetic hollow circular cylinder. The housing 21 houses therein a movable part 17 which can move in response to vibrations from the outside and a first magnetic core 11. The movable part 17 includes a second magnetic core 12 and an adjusting mass 16. Further, the housing 21 houses an exciting coil 14 for generating a magnetic field having intensity according to the current supplied thereto. The exciting coil 14 is made by winding a wire around a bobbin 15 having an annular shape.

The first magnetic core (first magnetic member) 11 and the second magnetic core (second magnetic member) 12 are a plurality of (two in this example) magnetic members forming a closed magnetic field circuit (indicated with blank arrows) having an annular shape in cross section through which the magnetic field generated by the exciting coil 14 transmits.

The second magnetic core 12 forms the movable part 17 and includes a pillar 12a extending in an axial direction of a hollow circular cylinder 11a and a second extending part 12b extending from the pillar 12a toward an outside of the circumferential direction of the pillar 12a.

The first magnetic core 11 includes the hollow circular cylinder 11a disposed between the housing 21 and the exciting coil 14, and an extending part 11b extending from the hollow circular cylinder 11a toward inside regarding a circumferential direction.

A magnetic viscoelastic elastomer (magnetic response-type elastic body (MRE)) 13 is arranged to form the closed magnetic circuit in which the magnetic viscoelastic elastomer connects the first magnetic core 11 to the second magnetic core 12 at at least one part (two parts in this example). More specifically, the magnetic viscoelastic elastomer 13 connects the first magnetic core 11 to the second magnetic core 12 therebetween in a direction perpendicular to a movable direction of the movable part 17 (in a horizontal direction in FIG. 1). The magnetic viscoelastic elastomers 13 are parts intermittently formed in the circumferential direction of the first and second magnetic cores 11, 12 which form a ring to connect an internal end of the extending part 11b to an outer end of the second extending part 12b.

In this example, when the exciting coil 14 is excited, as shown with the blank arrows, a magnetic flux transmits through a closed magnetic circuit starting from the hollow circular cylinder 11a via the extending part 11b, the magnetic viscoelastic elastomers 13, the second extending part 12b, the pillar 12a, and the second extending part 12b, and returning to the extending part 11b through the magnetic viscoelastic elastomer 13.

The magnetic viscoelastic elastomer 13 is a member of which viscoelastic property varies in accordance with an intensity of the magnetic field generated by the exciting coil 14. More specifically, the magnetic viscoelastic elastomer 13 comprises an elastic material such as a rubber, etc. to which magnetic particles 13a such as iron power, is doped and has a property in which a stiffness becomes high when the magnetic field generated by the exciting coil 14 has a high intensity.

The adjusting mass 16 is provided on (fixed to) an outer circumference of the pillar 12a as a mass member which is non-magnetic material forming the movable part 17.

Figure 2:
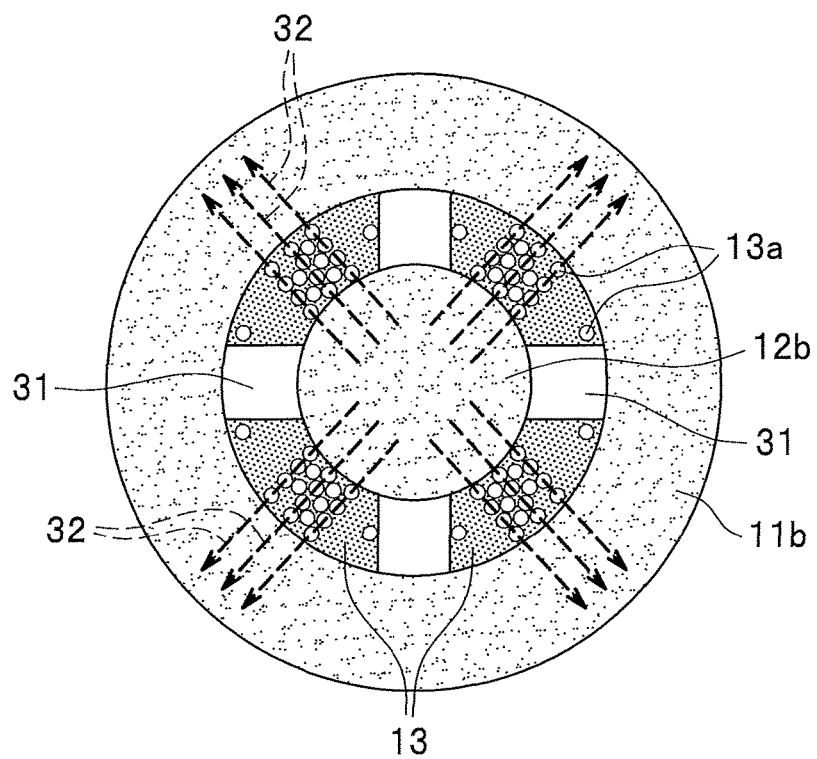
FIG. 2 is a top view of a first extending part, a second extending part, and the magnetic viscoelastic elastomer in FIG. 1.

FIG. 2 is a top view of a first extending part 11b, a second extending part 12b, and magnetic viscoelastic elastomers 13 in FIG. 1.

The first extending part 11b has a toric shape part of the first magnetic core 11 installed on a side of a housing 21. The second extending part 12b is substantially coaxial with the first extending part 11b and a part of the second magnetic core 12 of the movable part 17 disposed inside a toric shape of the first extending part 11b.

More specifically, the magnetic viscoelastic elastomer 13 is connected to the first extending part 11b and the second extending part 12b, and a viscoelastic character varies in accordance with a magnitude of the magnetic field generated by the exciting coil 14.

In addition, in the example shown in FIG. 2, between the first extending part 11b and the second extending part 12b, there are regions 31 having a non-magnetic characteristic in which the magnetic viscoelastic elastomer 13 is not formed intermittently in the circumferential direction of toric shapes of the first extending part 11b and the second extending part 12b. There are four regions 31 in the example in FIG. 2. The regions 31 are gaps penetrating the magnetic viscoelastic elastomer 13, i.e., through holes.

Figure 3:
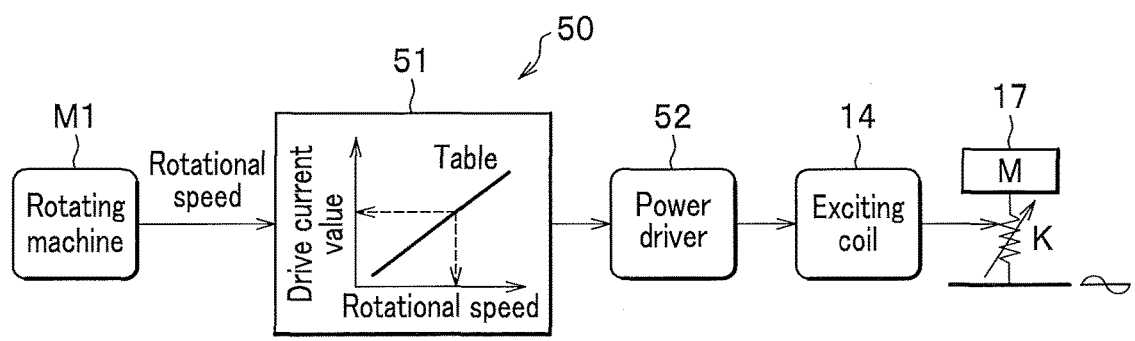
FIG. 3 is a general block diagram of a control system of the active vibration controller according to the first embodiment of the present invention.

FIG. 3 is a general block diagram of a control system 50 of the active vibration controller 1 according to the first embodiment of the present invention. A table 51 is used to obtain a drive current value in accordance with a rotational speed of a rotating machine M1 such as an engine of a vehicle. A power driver 52 including semiconductor switching elements, etc. applies a drive current to the exciting coil 14. This excites the exciting coil 14 with the drive current of which intensity is determined according to the rotational speed of the rotating machine M1. The magnetic field generated by the exciting coil 14 varies in intensity in accordance with the rotational speed of the rotating machine M1, which varies the stiffness of the magnetic viscoelastic elastomer 13 having the movable part 17 (mass M), which changes a spring constant (K) of the magnetic viscoelastic elastomer 13.

Next, an operation of the active vibration controller 1 is described below.

In the active vibration controller 1, when the magnetic viscoelastic elastomer 13 vibrates in vertical direction in FIG. 1 due to generation of vibrations, a shearing force is applied to the magnetic viscoelastic elastomer 13 in the vertical direction in FIG. 1 due to the vibration generation, so that an arrangement of the magnetic particles 13a is deviated. In this state, when a magnetic field is applied thereto with the exciting coil 14, the magnetic particles 13a tend to line in the direction of the magnetic field. This resists an external force, so that the apparent stiffness of the magnetic viscoelastic elastomer 13 increases. The variation of the stiffness of the magnetic viscoelastic elastomer 13 varies a resonance frequency of the movable part 17, which changes a frequency of damping the vibrations. Because the stiffness in this case varies in accordance with the rotational speed of the engine, etc. of the vehicle as shown in the table 51, the vibrations can be suppressed efficiently in accordance with variation in the rotational speed of the engine, etc. of the vehicle.

Magnetic fields 32 transmitting from the second extending part 12b to the first extending part 11b are shown with arrows having broken lines. The magnetic field 32 transmits through the magnetic viscoelastic elastomer 13 in a concentrated manner avoiding the region 31. In other words, though the magnetic field generated by the exciting coil 14 does not change, it is possible to apply a strong magnetic field to the magnetic viscoelastic elastomer 13 in a concentrated manner by providing the region 31 being a non-magnetic member between the second extending part 12b and the first extending part 11b. Accordingly, the magnetic field can be applied to the magnetic viscoelastic elastomer 13 efficiently, which can decrease a lower limit of the base stiffness of the magnetic viscoelastic elastomer 13. Further, because it becomes unnecessary to increase the quantity of the magnetic particles 13a, a manufacturing cost of the magnetic viscoelastic elastomer 13 can be decreased. Further, this can increase an effect of the magnetic viscoelastic elastomer 13 as a spring in the dynamic damper by decreasing the damper characteristic of the magnetic viscoelastic elastomer 13 itself.

Figure 7:
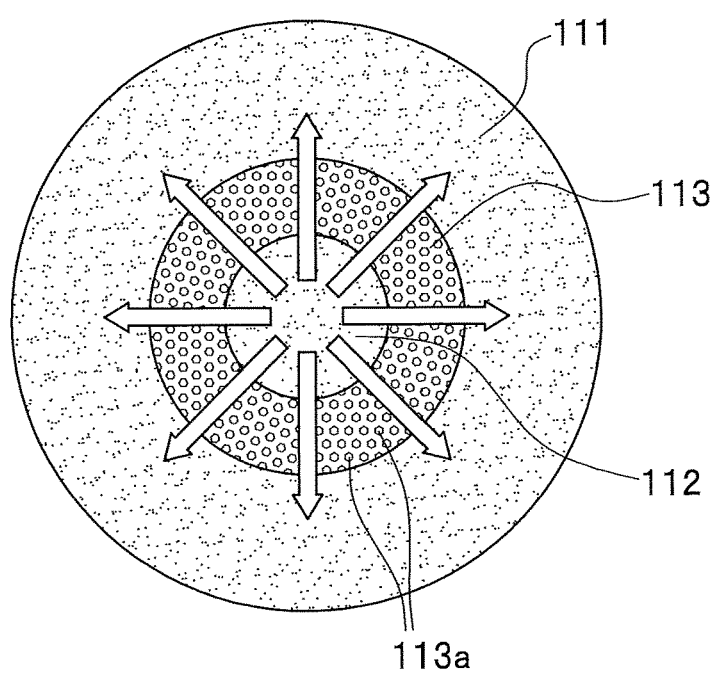
FIG. 7 is a top view of the first extending part, the second extending part, and the magnetic viscoelastic elastomer according to a comparative example.

FIG. 7 shows a comparative example for comparison with FIG. 2. In this comparative example, FIG. 7 shows magnetic fields with bank arrows in a case in which the region 31 is not provided. In this comparative example, it can be understood that the magnetic fields are distributed over the whole of a magnetic viscoelastic elastomer 113 which is fulfilled between a first magnetic core 112b and the second magnetic core 111b. Further, it can be understood to increase a quantity of the magnetic particles 113a.

Second Embodiment

The below embodiments have the same general configurations as that of the first embodiment as shown in FIGS. 1 and 3, and thus, a detailed illustration and description are omitted.

Figure 4:
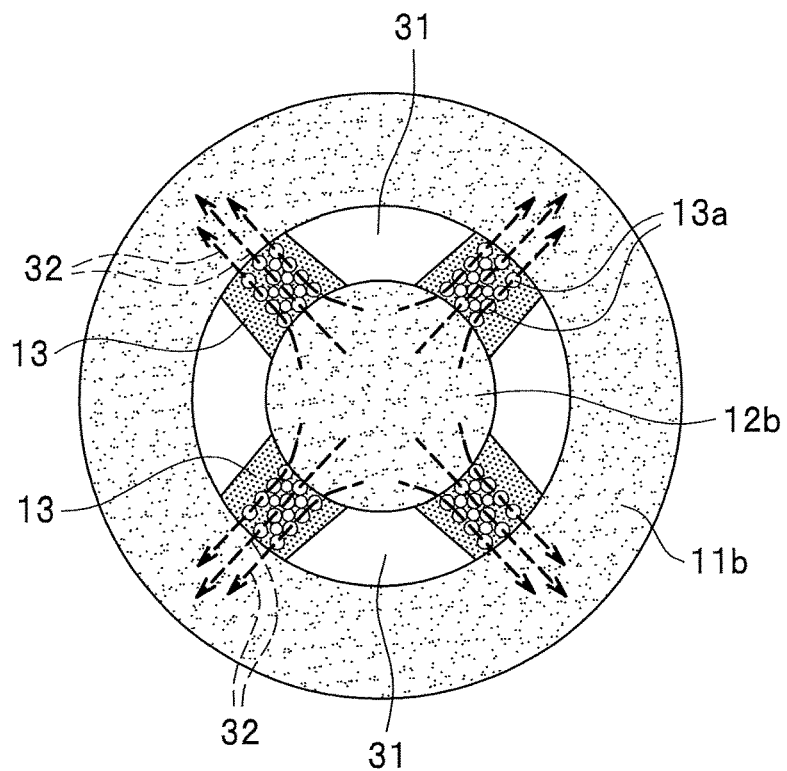
FIG. 4 is a top view of the first extending part, the second extending part, and the magnetic viscoelastic elastomer according to a second embodiment of the present invention.

The difference between the first embodiment and the second embodiment is in that a configuration shown in FIG. 4 is used in place of the configuration shown in FIG. 2.

More specifically, the magnetic viscoelastic elastomer 13 is formed to have a cross sectional area orthogonal with a direction (opposite direction) of the magnetic flux lines 32 transmitting through the magnetic viscoelastic elastomer 13 is made smaller in the direction (opposite direction) as the cross sectional area go closer to the first magnetic core 11 (second magnetic core).

This makes the magnetic flux lines 32 concentrated, which can apply the magnetic field to the magnetic viscoelastic elastomer 13 efficiently.

Third Embodiment

Figure 5:
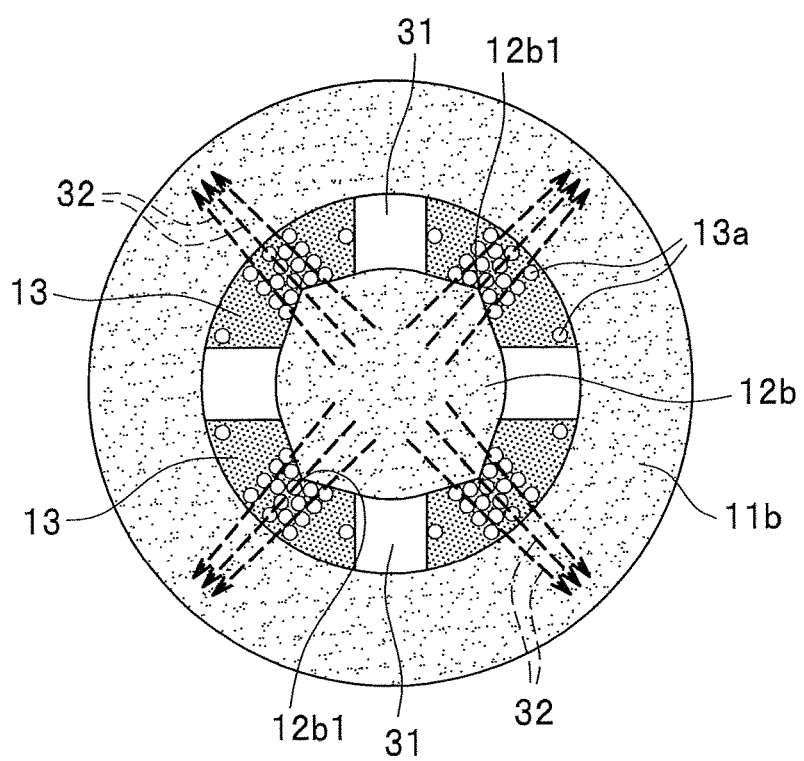
FIG. 5 is a top view of the first extending part, the second extending part, and the magnetic viscoelastic elastomer according to a third embodiment of the present invention.

There is a difference between the first embodiment and the third embodiment is a configuration shown in FIG. 5 is used in place of the configuration shown in FIG. 2. More specifically, the second magnetic core 12b has protruding portions 12b1 each protruding from a connection place thereof with the magnetic viscoelastic elastomer 13 toward the magnetic viscoelastic elastomer 13.

This makes the magnetic flux lines 32 concentrated at the protruding portion 12b1, so that the magnetic field can be applied to the magnetic viscoelastic elastomer 13 efficiently.

Fourth Embodiment

Figure 6:
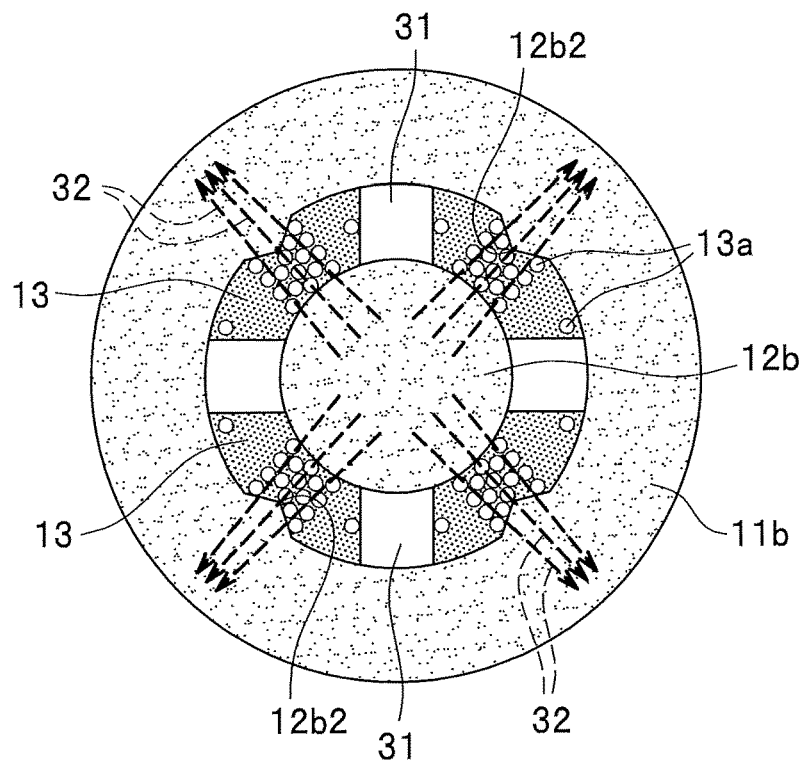
FIG. 6 is a top view of the first extending part, the second extending part, and the magnetic viscoelastic elastomer according to a forth embodiment of the present invention.

There is a difference between the first embodiment and the fourth embodiment is a configuration shown in FIG. 6 is used in place of the configuration shown in FIG. 2. More specifically, the first magnetic core 11b has protruding portions 12b2 each protruding from connection places thereof with the magnetic viscoelastic elastomer 13 toward the magnetic viscoelastic elastomer 13.

This makes the magnetic flux lines 32 concentrated at the protruding portion 12b2, so that the magnetic field can be applied to the magnetic viscoelastic elastomer 13 efficiently.

As described above, there is provided an active vibration controller comprising:

a first magnetic core 11 including a first end (first extending part 11b);

a movable member 17 including a second magnetic core 12 including a second end (second extending part 12b);

an exciting coil 14 being coupled to a magnetic circuit including the first and second magnetic cores 11, 12;

a magnetic viscoelastic elastomer 13 that connects the first end and the second end to support the second magnetic core 12 relative to the first magnetic core 11 with a magnetic viscoelastic property varying in accordance with a magnitude of the magnetic field generated by the exciting coil 14 between the first and second ends in the magnetic circuit in accordance with an intensity of a current supplied to the exciting coil 14, the magnetic circuit further including the magnetic viscoelastic elastomer 13. The the magnetic viscoelastic elastomer 13 has a region 31 having a non-magnetic property between the first and the second magnetic cores 11, 12.

According to this configuration, vibrations externally applied to the first and second magnetic cores 11, 12 are controlled by the resonance vibration in the second core and the magnetic viscoelastic elastomer via the first magnetic core 11 in which a resonance frequency of the the movable member 17 is determined (varied) by the viscoelastic property and the intensity of the current. In other words, the first magnetic core 11 outputs a vibration suppression force of which resonance frequency can be controlled in accordance the current supplied to the coil. The magnetic flux lines 32 are concentrated in the magnetic viscoelastic elastomer 13 between the first and second ends because the magnetic path is narrowed by the region 31 having the non-magnetic property between the first and the second magnetic cores 11, 12. The movable member 17 may further include an additional mass 16. In the above-described embodiments, the exciting coil 14 generates a magnetic field in the second magnetic member 12. The magnetic field circulates the magnetic circuit from the second magnetic core via the second end, the first magnetic core via the first end, and another magnetic viscoelastic elastomer 13 to the second magnetic core.

In the above-described embodiments, one side of the magnetic viscoelastic elastomers 13 located at a lower part of the active vibration controller 1 can be omitted because the magnetic field can transmit through the gap between the extending part 11b and the second extending part 12b. However, an elastomer without magnetic powder may be necessary to keep the distance between the extending part 11b and the second extending part 12b. To keep this distance, a bearing can be used.

The invention claimed is:

1. An active vibration controller comprising:
   a housing;
   a first magnetic member having a toric shape, the first magnetic member installed on a side of the housing;
   a movable member including a second magnetic member that is substantially coaxial with the first magnetic member and disposed inside the first magnetic member;
   an exciting coil that generates a magnetic field in accordance with an intensity of a current supplied thereto, wherein the exciting coil generates the magnetic field along a circumferential direction; and
   a magnetic viscoelastic elastomer that has a magnetic viscoelastic property varying in accordance with a magnitude of the magnetic field generated by the exciting coil between a first extending part of the first magnetic member and a second extending part of the second magnetic member, and connects the first extending part of the first magnetic member to the second extending part of the second magnetic member,
   wherein a region having a non-magnetic property is defined within the magnetic viscoelastic elastomer between the first and the second magnetic members to concentrate magnetic flux of the magnetic field in the magnetic viscoelastic elastomer,
   wherein the magnetic viscoelastic elastomer has a cross sectional area orthogonal with a direction or an opposite direction in which the magnetic flux transmits through the magnetic viscoelastic elastomer, the cross sectional area becoming smaller in the direction or the opposite direction.

2. The active vibration controller as claimed in claim 1, wherein the region is a gap in the magnetic viscoelastic elastomer.

3. The active vibration controller as claimed in claim 1, wherein the first magnetic member includes, at a part thereof joined to the magnetic viscoelastic elastomer, a protruding portion protruding toward the magnetic viscoelastic elastomer.

4. The active vibration controller as claimed in claim 1, wherein the second magnetic member includes, at a part thereof joined to the magnetic viscoelastic elastomer, a protruding portion protruding toward the magnetic viscoelastic elastomer.

5. The active vibration controller as claimed in claim 2, wherein the first magnetic member includes, at a part thereof joined to the magnetic viscoelastic elastomer, a protruding portion protruding toward the magnetic viscoelastic elastomer.

6. The active vibration controller as claimed in claim 2, wherein the second magnetic member includes, at a part thereof joined to the magnetic viscoelastic elastomer, a protruding portion protruding toward the magnetic viscoelastic elastomer.

7. The active vibration controller as claimed in claim 1, wherein the exciting coil generates the magnetic field in the second magnetic member in an axial direction of the first magnetic member.

* * * * *